US009285067B2

(12) United States Patent
Hooghart et al.

(10) Patent No.: US 9,285,067 B2
(45) Date of Patent: Mar. 15, 2016

(54) MODULAR DOUBLE ADJUSTABLE CHOCK

(75) Inventors: Bram Hooghart, Ridderkerk (NL); Rene Vermeulen, Spijkenisse (NL); Dick Vogelaar, Zwijndrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 110 days.

(21) Appl. No.: 14/114,298

(22) PCT Filed: Apr. 28, 2011

(86) PCT No.: PCT/EP2011/002125
§ 371 (c)(1),
(2), (4) Date: Feb. 18, 2014

(87) PCT Pub. No.: WO2012/146261
PCT Pub. Date: Nov. 1, 2012

(65) Prior Publication Data
US 2014/0166845 A1    Jun. 19, 2014

(51) Int. Cl.
*F16M 7/00* (2006.01)
*F16B 5/02* (2006.01)
*F16M 11/04* (2006.01)
*B23Q 1/00* (2006.01)

(52) U.S. Cl.
CPC ............... *F16M 7/00* (2013.01); *B23Q 1/0054* (2013.01); *F16B 5/0225* (2013.01); *F16B 5/0233* (2013.01); *F16M 11/04* (2013.01)

(58) Field of Classification Search
CPC ........ F16M 7/00; F16M 11/04; F16B 5/0225; F16B 5/0233; B23Q 1/0054
USPC ...................................................... 248/637
See application file for complete search history.

(56) References Cited

U.S. PATENT DOCUMENTS

| | | | | | |
|---|---|---|---|---|---|
| 1,380,347 | A | * | 6/1921 | Blume ................. | F16B 5/0216 248/188.1 |
| 2,940,784 | A | * | 6/1960 | Fell ........................ | F16B 5/0233 248/180.1 |
| 3,361,410 | A | * | 1/1968 | Messer .................... | F16M 7/00 248/188.4 |
| 4,061,298 | A | * | 12/1977 | Kober .......................... | 248/677 |
| 5,000,416 | A | * | 3/1991 | Fantasia ............... | B23Q 1/5462 248/182.1 |

(Continued)

FOREIGN PATENT DOCUMENTS

| | | | | |
|---|---|---|---|---|
| DE | 2304132 A1 | * | 8/1974 | ............ F16B 35/041 |
| DE | 2344348 A1 | * | 3/1975 | ............... F16M 7/00 |

(Continued)

*Primary Examiner* — Terrell McKinnon
*Assistant Examiner* — Eret McNichols
(74) *Attorney, Agent, or Firm* — Bryan Peckjian; SKF USA Inc. Patent Dept.

(57) ABSTRACT

An adjustable chock (100) of a modular design comprises a first element (102), a second element (108), a center element (104), and a center stud (106). In operational use of the chock, the first element engages with a piece of machinery (101) and the second element engages with a support (103). The first element (102) and the center element (106) have complementarily shaped contact surfaces to allow for lateral adjustment of the first element relative to the second element. The center stud (106) is connected to the center element (104) through a screwed connection. The center stud (106) is connected to the second element (108) through another screwed connection. The modular design allows using the same first element (102), the same second element (108) and the same center element (104) with center studs of different lengths.

5 Claims, 4 Drawing Sheets

(56) References Cited

U.S. PATENT DOCUMENTS

| | | | |
|---|---|---|---|
| 6,068,234 A | 5/2000 | Keus | |
| 6,889,946 B2* | 5/2005 | Bizaj | 248/188.2 |
| 7,438,274 B2 | 10/2008 | Vermeulen | |
| 7,451,930 B1* | 11/2008 | Neff | G02B 7/00 235/435 |
| 7,819,375 B1* | 10/2010 | Johansen | 248/677 |
| 8,511,637 B2* | 8/2013 | Mitsch | 248/677 |
| 2002/0109054 A1* | 8/2002 | Burr | 248/188.4 |
| 2005/0061946 A1* | 3/2005 | Krapels | 248/677 |
| 2006/0237622 A1* | 10/2006 | Vermeulen | 248/637 |
| 2008/0056809 A1* | 3/2008 | Kielczewski et al. | 403/118 |
| 2009/0211058 A1* | 8/2009 | Nagayama | 16/446 |
| 2010/0051763 A1* | 3/2010 | Knight et al. | 248/161 |
| 2011/0198478 A1* | 8/2011 | Chang et al. | 248/670 |
| 2014/0060724 A1* | 3/2014 | Amato et al. | 156/92 |
| 2014/0353463 A1* | 12/2014 | Ghaisas | 248/678 |

FOREIGN PATENT DOCUMENTS

| | | |
|---|---|---|
| EP | 2085679 A2 | 8/2009 |
| WO | 9735144 A1 | 9/1997 |
| WO | 03091618 A1 | 11/2003 |

* cited by examiner

MODULAR DOUBLE ADJUSTABLE CHOCK

CROSS-REFERENCE

This application is the U.S. National Stage of International Application No. PCT/EP2011/002125 filed on Apr. 28, 2011, the content of which is hereby incorporated by reference in its entirety.

FIELD OF THE INVENTION

The invention relates to a system designed for use as an adjustable chock for connecting a piece of machinery to a support. The invention also relates to a further system comprising machinery mounted on a support via an adjustable chock.

BACKGROUND ART

Adjustable chocks are known in the art. See, for example, U.S. Pat. No. 7,438,274, issued to René Vermeulen for "Adjustable foot for setting up equipment in alignment" and incorporated herein by reference, and U.S. Pat. No. 6,068,234 (corresponds to WO97/35144), issued to Elbert Keus for "Setting foot provided with sealing means", and incorporated herein by reference.

Each of the adjustable chock of U.S. Pat. No. 7,438,274 and the adjustable chock of U.S. Pat. No. 6,068,234 is referred to herein below as the known adjustable chock. The known adjustable chock comprises a first element, an intermediate element and a second element.

The first element has a rotationally symmetrical first surface that is convex. The first element has a first through-hole extending across the first element. The first through-hole is arranged coaxially with a first axis of rotational symmetry of the first surface.

The intermediate element has a rotationally symmetrical intermediate surface that is concave. The intermediate element has an intermediate through-hole extending across the intermediate element. The intermediate through-hole is arranged coaxially with the rotationally symmetrical intermediate surface. The intermediate surface and the first surface are shaped complementarily and engage in operational use of the known adjustable chock. As a result, an orientation of the first axis of rotational symmetry of the first surface and an orientation of an intermediate axis of rotational symmetry of the intermediate surface can be adjusted relative to one another by sliding the first element across the intermediate element. Underneath the intermediate surface, the intermediate element has a hollow shaft that is arranged coaxially with the rotationally symmetrical intermediate surface. The intermediate through-hole of the intermediate element is arranged coaxially with the hollow-shaft. The hollow shaft has an external screw thread. The hollow shaft is configured for accommodating a shank of a bolt.

The second element has a second through-hole with an internal screw thread that matches the external screw thread of the hollow shaft.

In operational use of the known adjustable chock, a top surface of the first element abuts a piece of machinery, and a bottom surface of the second element abuts a support. The height of the known chocks is adjustable by means of rotating the intermediate element relative to the second element. The pitch of the external screw thread (and of the matching internal screw thread) determines the change in height per unit of angle of rotation. The minimum height is reached when the hollow shaft has been screwed so far into the second element that the hollow shaft abuts the support. The maximum change in height attainable depends on, among other things, an axial distance over which the hollow shaft can travel relative to the second element while the external screw thread and the internal screw thread remain engaged.

SUMMARY OF THE INVENTION

Consider different ranges of height to be bridged between the piece of machinery and the support. Per individual one of the ranges, a known adjustable chock of a suitable size is being used, whose height can be continuously adjusted across the individual range, by means of rotating the intermediate element and the second element relative to one another.

The inventor has realized that the configuration of the known adjustable chock requires that a different intermediate element of different axial length be provided for each different range of height to be bridged. The intermediate element is a relatively expensive mechanical component to make owing to, among other things, the machining operations required. The intermediate surface is made rotationally symmetrically concave and smooth, and the external screw thread is to be cut on the hollow shaft, that makes up an integral part of the intermediate element. A manufacturer of the known adjustable chocks and an installer of the known adjustable chocks have to keep a relatively large inventory of differently sized, relatively expensive intermediate elements in order to be able to cater to different applications in the field that require different heights to be bridged by the known adjustable chock. This is an unattractive aspect of the business, if only from the perspective of costs.

One solution could be to provide different second elements of different heights for each different range of height to be bridged. The second element itself is a component that is less complicated to manufacture than the intermediate element and, therefore, less expensive. However, some applications of adjustable chocks require that the shank of the bolt, which is accommodated in the hollow shaft in operational use of the adjustable chock, be supported over the shank's full length. A reason for this is that the support over the shank's length reduces the magnitude of shearing stress in the shank. If the second through-hole of the second element is threaded over the full length of the through-hole for adjustment purposes, no such support of the bolt's shank is possible.

As an alternative solution, consider the second through-hole of the second element to be threaded only over a portion. The remainder of the second through-hole of the second element is unthreaded and is given a diameter suitable for supporting the bolt's shank. The diameter of the second through-hole at the threaded portion may then be substantially different from the diameter of the second through-hole at the unthreaded portion. This alternative solution requires differently sized and, therefore, differently machined second elements for different ranges of heights. This is, again, an unattractive aspect from the perspective of costs involved in manufacturing and maintaining an inventory.

The inventor proposes a more attractive solution. An aspect of the solution resides in replacing the known intermediate element of the known adjustable chock by two separate components: a center element accommodating the rotationally symmetrical intermediate surface, and a separate center stud that serves as the hollow shaft. The center stud basically consists of a threaded hollow rod. In other words, it has an externally threaded cylindrical surface with a diameter that defines the maximum diameter of the centre stud. The external screw thread of the centre stud engages with a complementary inner screw thread of the center element. As a result, the same center element and the same second element can be combined with externally threaded center studs of different lengths so as to create different adjustable chocks suitable for different ranges of height. Externally threaded center studs of different lengths can be simply made by cutting off pieces of different lengths of a threaded hollow rod. A threaded hollow rod is a relatively inexpensive component, and cutting is a relatively inexpensive machining operation. In addition, part of the adjustability of the adjustable chock in the invention can be delegated to cutting a piece of pre-determined, accurate length off the threaded hollow rod. This enables to control in advance the length, over which the center stud engages with the center element in operational use of the adjustable chock of the invention, and the length, over which the center stud engages with the second element in operational use of the adjustable chock of the invention. A greater length of engagement results in stronger mechanical support.

Accordingly, the modular design of the adjustable chock of the invention enables the same first element and the same center element and, optionally, the same second element, to be used with different center studs of different lengths, and to more accurately control the mechanical strength of the center stud engaging the center element and the second element. A center stud of a specific length is a relatively inexpensive component to make.

Note that the adjustable chock according to the invention enables to adjust the height of the adjustable chock in two ways. One way of adjusting the height consists of changing the axial position of the center element relative to the center stud. This is achieved by screwing the center element and the center stud inwards or outwards relative to one another. Another way of adjusting the height consists of changing the axial position of the center stud and the second element relative to one another. This is achieved by screwing the center stud and the second element inwards or outwards relative to one another.

Also note that in the adjustable chock of the invention, the second element can be omitted if the center stud remains abutted against one of the piece of machinery and the support. Adjustment of the height is obtained through screwing the center element and the center stud inwards or outwards relative to one another.

The adjustable chock in the invention could be used in either one of a first orientation and a second orientation. In the first orientation, the first element is arranged above the second element with regard to the direction of gravity. In the second orientation, the first element is arranged underneath the second element with regard to the direction of gravity.

Also note that the intermediate surface of the center element could be one of convex and concave, if the engaging first surface of the first element is the other one of convex and concave.

More generically, the inventor proposes a system designed for use as an adjustable chock for connecting machinery to a support along a common axis of the adjustable chock. The system comprises a first element, a center element and a center stud. The first element has a first surface that is rotationally symmetrical and that is one of convex and concave. The first surface has a first axis of rotational symmetry substantially aligned with the common axis of the adjustable chock in operational use of the adjustable chock. The center element has an intermediate surface that is rotationally symmetrical and that is the other one of convex and concave. The intermediate surface has a center axis of rotational symmetry substantially aligned with the common axis of the adjustable chock in operational use of the adjustable chock. The first surface and the intermediate surface are complementarily shaped for engaging in operational use of the adjustable chock. The center element has a center through-hole that is cylindrical and that is coaxial with the intermediate surface. A wall of the center through-hole is provided with an inner screw thread. The center stud comprises a cylindrical outer surface. The cylindrical outer surface has a stud axis of rotational symmetry that is substantially aligned with the common axis of the adjustable chock in operational use of the adjustable chock. The cylindrical outer surface is provided with an outer screw thread for engaging with the inner screw thread of the center element so as to have the center stud and the center element connected through a screwed connection in operational use of the adjustable chock. The center stud comprises a stud through-hole that is cylindrical, that extends across a full length of the center stud and that is coaxial with the cylindrical outer surface. A diameter of the stud through-hole matches a diameter of a shank of a bolt accommodated in the adjustable chock in operational use of the adjustable chock. In an embodiment of the system of the invention, the first element has a first through-hole coaxial with the first surface. A diameter of the first through-hole is substantially larger than another diameter of the stud through-hole.

In operational use of the adjustable chock of the invention, the center element and the center stud form a rigid assembly, which can be laterally moved relative to the first element while the first surface of the first element and the complementarily shaped intermediate surface of the center element remain engaged. When the bolt has been accommodated, the shank of the bolt moves in unison with the assembly. The shank of the bolt extends beyond the adjustable chock. If the diameter of the first through-hole were not larger than the other diameter of the stud through-hole, the wall of the first through-hole would prevent the shank of the bolt to move laterally, thus preventing any lateral adjustment of the adjustable chock while the first surface of the first element and the complementarily shaped intermediate surface of the center element remain engaged. For this reason, the expression "substantially aligned with the axis of the adjustable chock", as used above, is meant to cover angular deviations from the exact alignment that are small and that arise in the practical application of the adjustable chock of the invention. The deviations arise as a result of degrees of freedom allowed in minor lateral adjustments of the relative positions of the complementarily shaped first surface of the first element and intermediate surface of the center element while the first surface and the intermediate surface remain engaged. Typically, the allowable angular deviations are in the order of, for example, 5° or smaller. As specified above, the diameter of the stud through-hole matches the diameter of the shank of the bolt accommodated in the adjustable chock in operational use of the adjustable chock, and the diameter of the first through-hole in the first element is substantially larger than the diameter of the stud through-hole. Accordingly, the diameter of the stud through-hole is chosen so as to provide full support of the shank of the bolt in operational use of the adjustable chock in the invention. While adjusting the adjustable chock of the invention with the bolt in place, the minor lateral adjustment (of the relative positions of the complementarily shaped first surface of the first element and intermediate surface of the center element) is enabled by having the diameter of the first through-hole in the first element substantially larger than the diameter of the stud through-hole, i.e., substantially larger than the diameter of the shank of the bolt.

A further embodiment of the system of the invention comprises a second element. The second element comprises a cylindrical recess with an inner screw thread for engaging with the outer screw thread of the center stud so as to have the center stud and the second element connected through a further screwed connection.

The adjustable chock of this further embodiment has the double adjustment feature discussed above. The invention also relates to a further system comprising a piece of machinery and a support that are attached to each other via at least one adjustable chock according to a system of the invention.

BRIEF DESCRIPTION OF THE DRAWING

The invention is explained in further detail, by way of example and with reference to the accompanying drawing, wherein.

Throughout the Figures, similar or corresponding features are indicated by same reference numerals.

DETAILED EMBODIMENTS

The invention relates to a system designed for use as an adjustable chock for connecting machinery to a support along an axis of the adjustable chock. The system may be made commercially available as an assembled entity of as a kit-of-parts.

Figure 1:
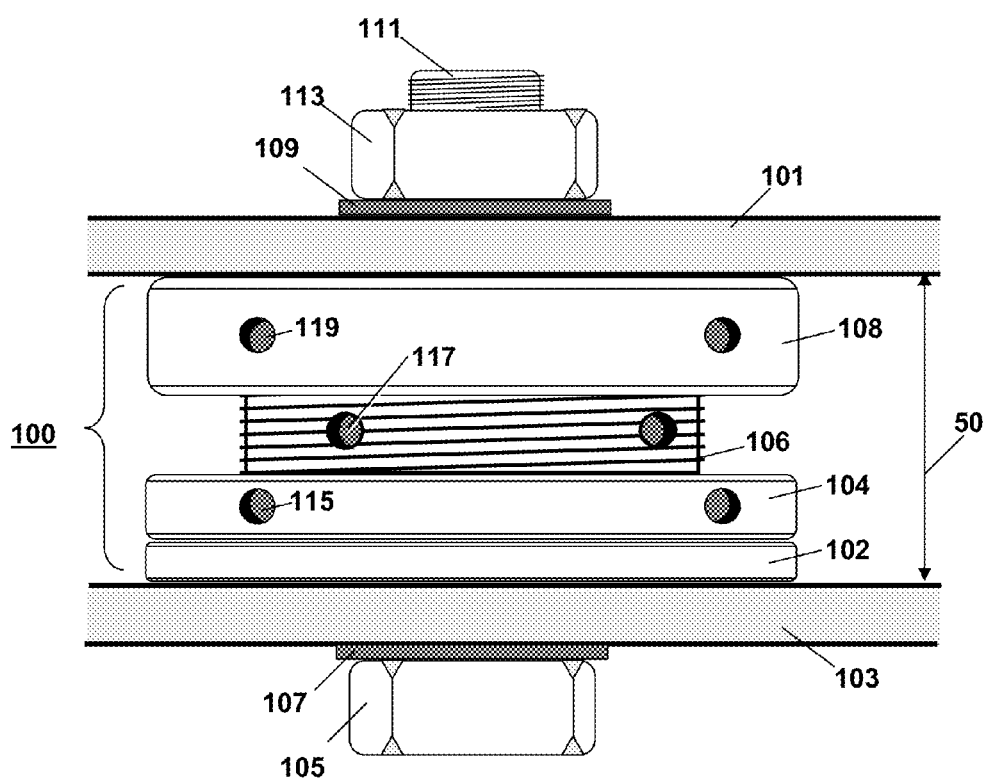
FIGS. 1, 2 and 3 are diagrams of a first adjustable chock according to the invention.
Figure 2:
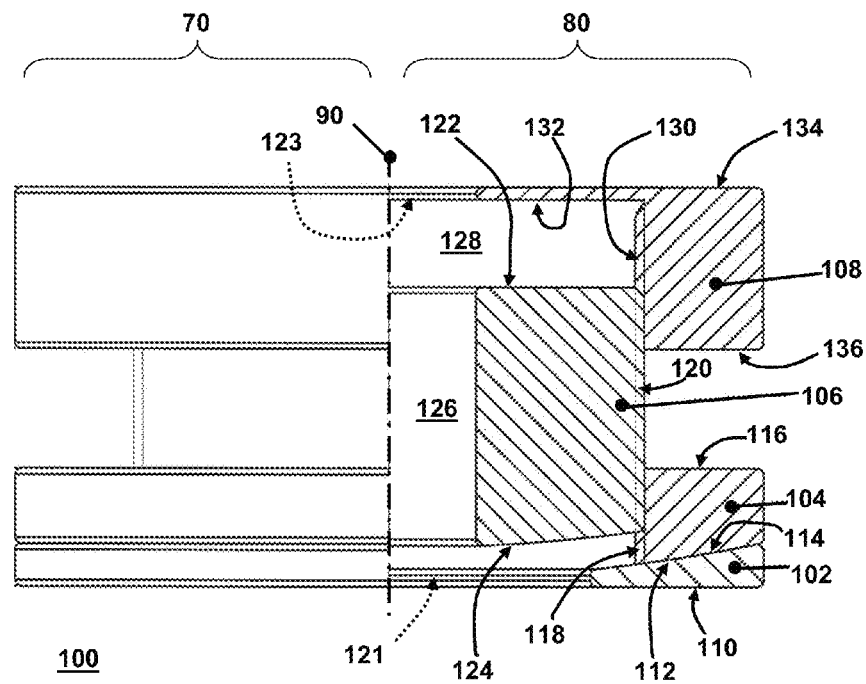
Figure 3:
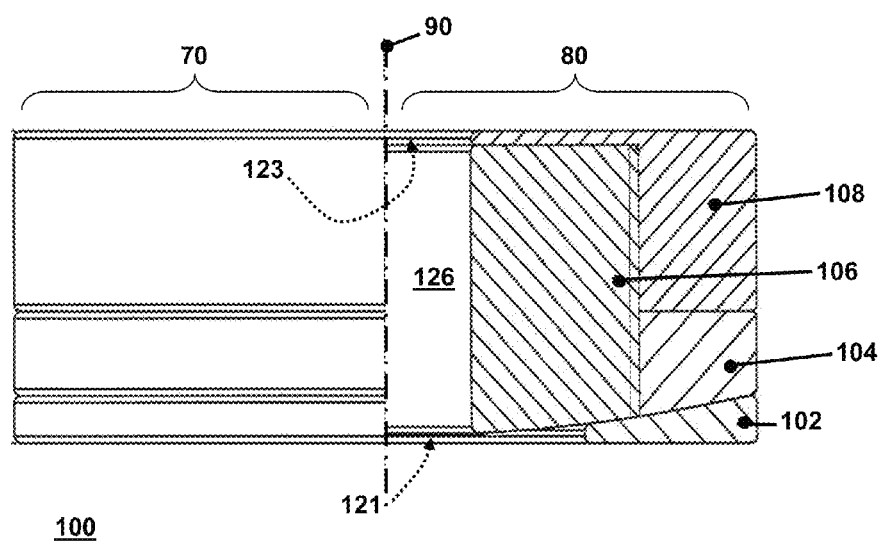

FIGS. 1, 2 and 3 are diagrams of a first adjustable chock 100 according to the invention. The first adjustable chock 100 is of a modular design and comprises a first element 102, a second element 108, a center element 104, and a center stud 106. In operational use of the chock 100, the first element engages with a piece of machinery 101 and the second element engages with a support 103. The first element 102 and the center element 104 have complementarily shaped contact surfaces to allow for lateral adjustment of the first element 102 relative to the second element 108. The center stud 106 is connected to the center element 104 through a screwed connection. The center stud 106 is connected to the second element 108 through another screwed connection. The modular design allows using the same first element 102, the same second element 108 and the same center element 104 with center studs of different lengths.

FIG. 1 illustrates the first adjustable chock 100 in operational use, mounted between a piece of machinery 101 and a support 103. The piece of machinery 101 comprises, e.g., a propulsion engine of a ship, and the support 103 is configured to accommodate the propulsion engine in operational use of the propulsion engine. The first element 102 engages one of: the piece of machinery 101 and the support 103, and the second element 108 engages the other one of the piece of machinery 101 and the support 103. In the example in the diagram of FIG. 1, the first element 102 engages the support 103, and the second element 108 engages the piece of machinery 101. The center stud 106 consists of a component having a right circularly cylindrical shape. The center stud 106 has a cylindrical outer surface with an external screw thread. Basically, the center stud 106 consists of a threaded hollow rod The center element 104 has a center through-hole with an internal screw thread that is complementary to the external screw thread of the center stud 106. Accordingly, the center element 104 and the center stud 106 can be jointed mechanically by means of a screwed connection. Rotating the center stud 106 relative to the center element 104 while jointed enables to adjust the length of an exposed part of the center stud 106 that extends from the center element 104. Likewise, the second element 108 has a second through-hole with an internal screw thread that is complementary to the external screw thread of the center stud 106. The second element 108 and the center stud 106 can be jointed mechanically by means of another screwed connection. Rotating the center stud 106 relative to the second element 108 while jointed enables to adjust the length of another exposed part of the center stud 106 that extends from the second element 108. Accordingly, a distance between the center element 104 and the second element 108, measured along the center stud 106, can be adjusted in two ways, independently of one another. A first way is by means of rotating the center element 104 relative to the center stud 106, and a second way is by means of rotating the second element 108 relative to the center stud 106. Adjusting the distance between the center element 104 and the second element 108 enables to properly position the piece of machinery 101 relative to the support 103, e.g., for aligning the piece of machinery 101 with another piece of machinery (not shown) mounted on the support 103. As there is only limited travel of the center stud 106 relative to the center element 104, and limited travel of the center stud 106 relative to the second element 108, a proper length of the center stud 106, measured along the axis of the cylindrical outer surface of the center stud 106, is to be determined in advance in order to bridge a length of a first gap 50 between the piece of machinery 101 and the support 103. In operational use of the first adjustable chock 100, the center stud 106 and the center element 104 need to remain engaged with each other over a sufficient length of the center stud 106 in order to be able to support the load formed by the piece of machinery 101. Likewise, the center stud 106 and the second element 108 need to remain engaged with each other over a sufficient portion of the length of the center stud 106 in order to be able to support the load formed by the piece of machinery 101.

After the distance has been adjusted to the desired length, a bolt 105 is stuck through a hole in the support 103, through a passageway for the bolt 105 in the first adjustable chock 100, and through another hole in the piece of machinery 101. The passageway is formed by a first through-hole of the first element 102, a center through-hole of the center element 104, a stud through-hole of the center stud 106 and a second through-hole of the second element 108. The first through-hole, the center through-hole, the stud through-hole, and the second through-hole are aligned in order to enable a shank of the bolt 105 to pass through. Typically, a washer 107 is positioned between a head of the bolt 105 and the support 103, and another washer 109 is positioned on a threaded portion 111 of the bolt 105 that extends through the hole in the piece of machinery 101. A nut 113 is screwed on the threaded portion 111 of the bolt 105 that extends beyond the piece of machinery 101, and is properly tightened in order to firmly attach the piece of machinery 101 to the support 103 via the first adjustable chock 100.

In order to be able to rotate the center element 104 relative to the center stud 106 during adjustment of the first adjustable chock 100, a torque is applied to the center element 104 and another torque is applied to the center stud 106. In order for an operator to apply a torque to the center element 104, the center element 104 is configured so as to facilitate applying the torque, e.g., by means of using a wrench. For example, the center element 104 has a polygonal outer perimeter (e.g., square or hexagonal) in a plane substantially perpendicular to an axis of the internal screw thread of the center through-hole of the center element 104. A square outer perimeter of a normalized size or a hexagonal outer perimeter of a normalized size enables the operator to use normalized open-end wrenches. As another example, an outer surface of the center element 104 that faces substantially radially outwards, relative to the axis of the internal screw thread of the center through-hole in the center element 104, has a specific profile, e.g., serrated in an angular direction, so that the outer surface can be gripped by a spanner wrench (US) (or: hook spanner (UK), or pin spanner). In the example shown, the outer surface of the center element 104 is provided with one or more holes to accommodate a pin of the spanner wrench or a tommy bar. The one or more holes are preferably blind so as to not substantially affect the mechanical strength of the center element 104. In order to not obscure the drawing, only a single one of the blind holes in the outer surface of the center element 104 is indicated with a reference numeral 115.

In order to enable an operator to apply a torque to the center stud 104, the center stud 104 is configured so as to facilitate applying the torque, e.g., by means of using a wrench. Note that a cylindrical outer surface of the center stud 106 accommodates the external screw thread. One or more holes may be provided in the cylindrical outer surface of the center stud 106, so that the external screw thread is only locally interrupted without interfering with the function and operation of the external screw thread. Alternatively, one or more slots may be provided in the cylindrical outer surface of the center stud 106 that only locally interrupt the external screw thread without interfering with the function and operation of the external screw thread. The one or more slots are oriented in the axial direction of the external screw thread so as to allow properly exerting a force in the angular direction on the center stud 106 by means of a spanner wrench inserted into the slot, i.e., substantially perpendicularly to the length of the slot in the angular direction. The slots or holes may be blind so as to not substantially affect the mechanical strength of the center stud 106. In the example of FIG. 1, the cylindrical outer surface of the center stud 106 is provided with one or more holes. In order to not obscure the drawing, only a single one of the holes in the cylindrical outer surface of the center stud 106 is indicated with a reference numeral 117.

In order to be able to rotate the second element 108 relative to the center stud 106, a torque is applied to the second element 104 and another torque is applied to the center stud 106. In order to enable an operator to apply a torque to the second element 108, the center element 108 is configured so as to facilitate applying the torque, e.g., by means of using a wrench. For example, the second element 108 has a polygonal outer perimeter (e.g., square or hexagonal) in a plane substantially perpendicular to an axis of the internal screw thread of the second through-hole hole of the second element 108. As another example, an outer surface of the second element 108 that faces substantially radially outwards relative to the axis of the internal screw thread of the second through-hole in the second element 108 has a specific profile, e.g., serrated in an angular direction, so that the surface can be gripped by a spanner wrench (US) (or: hook spanner (UK), or pin spanner). In the example shown, the outer surface of the second element 108 is provided with one or more holes to accommodate a pin of the spanner wrench. The one or more holes are preferably blind so as to not substantially affect the mechanical strength of the second element 108. In order to not obscure the drawing, only a single one of the holes in the outer surface of the second element 108 is indicated with a reference numeral 119.

FIGS. 2 and 3 are diagrams to illustrate the first adjustable chock 100 in further detail. The diagrams of FIGS. 2 and 3 show a side view 70 of the first adjustable chock 100 in the left half of the diagram of FIGS. 2 and 3, and a cross-section 80 of the first adjustable chock 100 in the right half of the diagrams of FIGS. 2 and 3. In the example of FIGS. 2 and 3, the first element 102 has a first axis of rotational symmetry, the center element 104 has a center axis of rotational symmetry, the center stud 106 has a stud axis of rotational symmetry and the second element 108 has second axis of rotational symmetry. The first element 102, the center element 104, the center stud 106 and the second element 108 can be positioned relative to each other in operational use of the first adjustable chock 100, in such a manner that the their respective axes of rotational symmetry are aligned with one another along a common axis 90 of the first adjustable chock 100. The cross-section 80 is then taken in any plane that comprises the common axis 90.

The first element 102 has an upper end with a first surface 112. In the embodiment of FIGS. 2 and 3, the first surface 112 is rotationally symmetrical and concave. In another embodiment (not shown), the first surface 112 is rotationally symmetrical and convex. The first axis of rotational symmetry of the first element 102 coincides with an axis of rotational symmetry of the first surface 112. In operational use of the first adjustable chock 100, the first axis of rotational symmetry of the first element 102 is substantially parallel to the common axis 90 of the first adjustable chock 100.

In the diagrams of FIGS. 1, 2 and 3, the first element 102 further has a lower end with a flat surface 110. The flat surface 110 is substantially perpendicular to the first axis of rotational symmetry of the first element 102. The first element 102 has a first through-hole 121 that is circularly cylindrical and that extends across the first element 102. The first axis of rotational symmetry of the first e coincides with an axis of the first through-hole 121.

In another embodiment (not shown), the lower end of the first element 102 has a surface other than flat, e.g., lying in a sloping plane that makes an angle with the common axis 90, the angle being different from 90°. For example, consider a piece of machinery (not shown here) that is mounted on top of a support (not shown here) that comprises two parallel steel beams that lie in the same horizontal plane. The upper surfaces of the steel beams are inclined toward each other in a cross-section of the two parallel steel beams in a vertical plane. The piece of machinery is mounted atop the two parallel steel beams. The piece of machinery interfaces with the two parallel steel beams via a plurality of chocks of the design of the first adjustable chock 100. Then, each specific one of the two parallel steel beams exerts a specific reaction force on the piece of machinery as a reaction on the force of gravity that is assumed to be directed vertically downwards. The specific reaction force has a vector component in the vertically upwards direction and another vector component in the horizontal direction and towards the other one of the parallel steel beams. Assume that, in first order, the piece of machinery has its center of gravity in the vertical plane that lies between the two parallel steel beams and at equal distance from each of the two parallel steel beams. As result of the inclined upper surfaces, the horizontal components of the reaction forces then serve to keep the position of the center of gravity of the piece of machinery in a stable equilibrium.

The center element 104 has an intermediate surface 114 at a bottom end of the center element 104. The intermediate surface 114 is convex and has a second axis of rotational symmetry. The first surface 112 of the first element 102 and the intermediate surface 114 of the center element 104 are complementary shaped so as to have the first surface 112 and the intermediate surface 114 engage over the full surface area of engagement. An upper surface 116 of the center element 104 is flat in this example.

The center element 104 is shaped as a rotationally symmetrical ring with a center through-hole hole extending in an axial direction across the center element 104. The center through-hole of the center element 104 has not been indicated by a reference numeral in the diagram of FIG. 1 in order to not obscure the drawing. An axis of rotational symmetry of the center through-hole of the center element 104 coincides with the center axis of rotational symmetry of the center element 104. An inner wall of the center through-hole of the center element 104 has an inner screw thread 118. The flat upper surface 116 is substantially perpendicular to the center axis of rotational symmetry of the center element 104.

The center stud 106 comprises a cylindrical outer surface centered on the stud axis of rotational symmetry of the center stud 106. The stud axis of rotational symmetry is substantially aligned with the common axis 90 in operational use of the first adjustable chock 100. The cylindrical outer surface of the center stud 106 is provided with an outer screw thread 120 for engaging with the inner screw thread 118 of the center element 104 in operational use of the first adjustable chock 100. The center stud 106 has an upper stud surface 122 that is bound by the cylindrical outer surface of the center stud 106. The upper stud surface 122 is rotationally symmetrical with respect to the stud axis of rotational symmetry of the center stud 106. The center stud 106 also has a lower stud surface 124 that is bound by the cylindrical outer surface of the center stud 106. The lower surface 124 is rotationally symmetrical with respect to the stud axis of rotational symmetry of the center stud 106. The center stud 106 has a stud through-hole 126 that is cylindrical and extends across the center stud 106 between the upper stud surface 122 and the lower stud surface 124. The stud through-hole 126 of the center stud 106 is coaxial with the cylindrical outer surface of the center stud 106. A diameter of the stud through-hole 126 of the center stud 106 is chosen so as to accommodate the shank of the bolt 105 in operational use of the first adjustable chock 100.

The lower stud surface 124 of the center stud 106 is illustrated as having a rotationally symmetrical convex shape that is complementary to the concave shape of the first surface 122 of the first element 102 when the center stud 106 and the first element 102 are arranged coaxially. In applications of the first adjustable chock 100, where shear forces have to be transferred via the first adjustable chock 100, and wherein bending forces have to be reduced, the lower stud surface 124 of the center stud 106 preferably has a shape that is complementary to the shape of the first surface 112 of the first element 102 so as to provide full support to the center stud 106 when abutting the first surface 112. Also, a convex lower surface 124 means that the stud through-hole 126 is longer than the cylindrical outer surface. The additional length provides additional support to the shank of the bolt 105, which is particularly advantageous when a long bolt is used in combination with a long centre stud.

In less critical applications, the lower stud surface 124 of the center stud 106 may be flat, i.e., lying in a plane perpendicular to the stud axis of rotational symmetry of the center stud 106. Also note that complementary shapes of the first surface 112 and the lower stud surface 124 reduces the risk of surface damage to the first surface 112 and/or to the lower stud surface 124 when the center stud 106 is screwed into the center element 104 until the lower stud surface 124 hits the first surface 112.

The second element 108 has a cylindrical recess 128 centered on the second axis of rotational symmetry of the second member 108. The second axis of rotational symmetry of the second element 108 is substantially aligned with the common axis 90 in operational use of the first adjustable chock 100.

The cylindrical recess 128 has a cylindrical inner wall that is provided with an internal screw thread 130 for engaging with the outer screw thread 120 of the center stud 106 in operational use of the first adjustable chock 100. That is, the center stud 106 and the second element 108 can be screwed into one another or out of one another.

The second element 108 has a second opening 123 giving access from outside to the cylindrical recess 128. The second opening 123 is coaxial with the cylindrical recess 128. A diameter of the second opening 123 of the second element 108 is chosen so as to accommodate the shank of the bolt 105 in operational use of the first adjustable chock 100.

The second opening 123 and the cylindrical recess 128 together form the second through-hole of the second element 108.

The cylindrical recess 128 has a recess wall 132 that is rotationally symmetrical and coaxial with the cylindrical recess 128. The recess wall 132 and the upper stud surface 122 of the center stud 106 are complementarily shaped so that the upper stud surface 122 engages with the recess wall 132 over the full surface area of the upper stud surface 122 when the center stud 106 has been screwed into the second element 108 to a maximum depth, as shown in the diagram of FIG. 3.

In the diagrams of FIGS. 2 and 3, the recess wall 132 and the upper stud surface 122 of the center stud 106 are illustrated as being flat, i.e., as lying in respective planes perpendicular to their respective axes of rotational symmetry. Other shapes of the recess wall 132 and the upper stud surface 122 are feasible. For example, the recess wall 132 is formed as a rotationally symmetrical concave surface, and the upper stud surface 122 of the center stud 106 is complementarily shaped as a rotationally symmetrical convex surface. If the upper stud surface 122 of the center stud 106 and the lower stud surface 124 of the center stud 106 have different shapes, the installer has to pay attention to the proper orientation of the center stud 106 relative to the center element 104 and the second element 108 when assembling the first adjustable chock 100. If the upper surface 122 of the center stud 106 and the lower surface 124 of the center stud 106 have identical shapes, the first adjustable chock 100 can be assembled with the center stud 106 in two orientations that are both correct.

The second element 108 has a lower second surface 136 that faces the flat upper surface 116 of the center element 104. The lower second surface 136 of the second element 108 is flat as well. The lower second surface 136 of the second element 108 and the upper surface 116 of the center element 108 may be given shapes other than flat. Preferably, the lower second surface 136 of the second element 108 and the upper surface 116 of the center element 108 are complementarily shaped so that the lower second surface 136 of the second element 108 engages with the upper surface 116 of the center element 104 over the full surface area of engagement when the center stud 106 has been screwed into the second element 108 and into the center element 104 to maximum depths, as shown in the diagram of FIG. 3.

FIGS. 1, 2 and 3 show an embodiment of the second element 108 of the first adjustable chock 100 with a top surface 134 that is flat, i.e., lying in a plane substantially perpendicular to the common axis 90 of the first adjustable chock 100. In another embodiment (not shown), the top surface 134 of the second element 108 has a surface other than flat, e.g., in order to match the shape of the surface of the piece of machinery or of the support, as has been discussed above with regard to the first element 102.

The passageway for the shank of the bolt 105, as mentioned above, is formed by the second through-hole of the second element 108, the stud through-hole 126 of the center stud 106 and the first through-hole 121 of the first element 102.

The first adjustable chock 100 is adjustable in height by means of screwing the center stud 106 farther into or father out of the center element 104, and/or by means of screwing the center stud 106 father into, or farther out of, the second element 108.

The first adjustable chock 100 is also adjustable with regard to an angular deviation between, on the one hand, the first axis of rotational symmetry of the first element 102 and, on the other hand, the center axis of rotational symmetry of the center element 104, the stud axis of rotational symmetry of the center stud 106 and the second axis of rotational symmetry of the second element 108, that are co-aligned when the second element 108 and the center element 106 have been screwed onto the center stud 106. This is explained as follows. Remember that the intermediate surface 114 of the center element 104 is convex, faces the concave first surface 112 of the first element 102 and is rotationally symmetrical. Consider the center stud 106 having been screwed into the center element 104 and into the second element 108. Then, the second axis of rotational symmetry of the second surface 114, the center axis of rotational symmetry of the center stud 106, and the second axis of rotational symmetry of the second element 108 are co-aligned. Also, the center stud 106, the center element 104 and the second element 108 then form a rigid assembly, whose orientation can be adjusted relative to the first element 102 by means of having the concave first surface 112 of the first element 102 engage the convex intermediate surface 114 of the center element 104 in an off-center manner. Owing to the complementarily shapes of the first surface 112 and the intermediate surface 114, an off-center engagement has the first surface 112 and the intermediate surface 114 fully contacting each other across the surface area of engagement. As specified above, the first through-hole 121 of the first element 102 is circularly cylindrical and extends across the first element 102. A diameter of the first through-hole is chosen bigger than another diameter of the shank of the bolt 105 so as to allow a longitudinal axis of the shank to make an angle with the first axis of rotational symmetry of the first element 102 that differs from 0°. The diameter of the first through-hole 121 is chosen so as to allow a maximum magnitude of such an angle of, for example, 5°.

Figure 4:
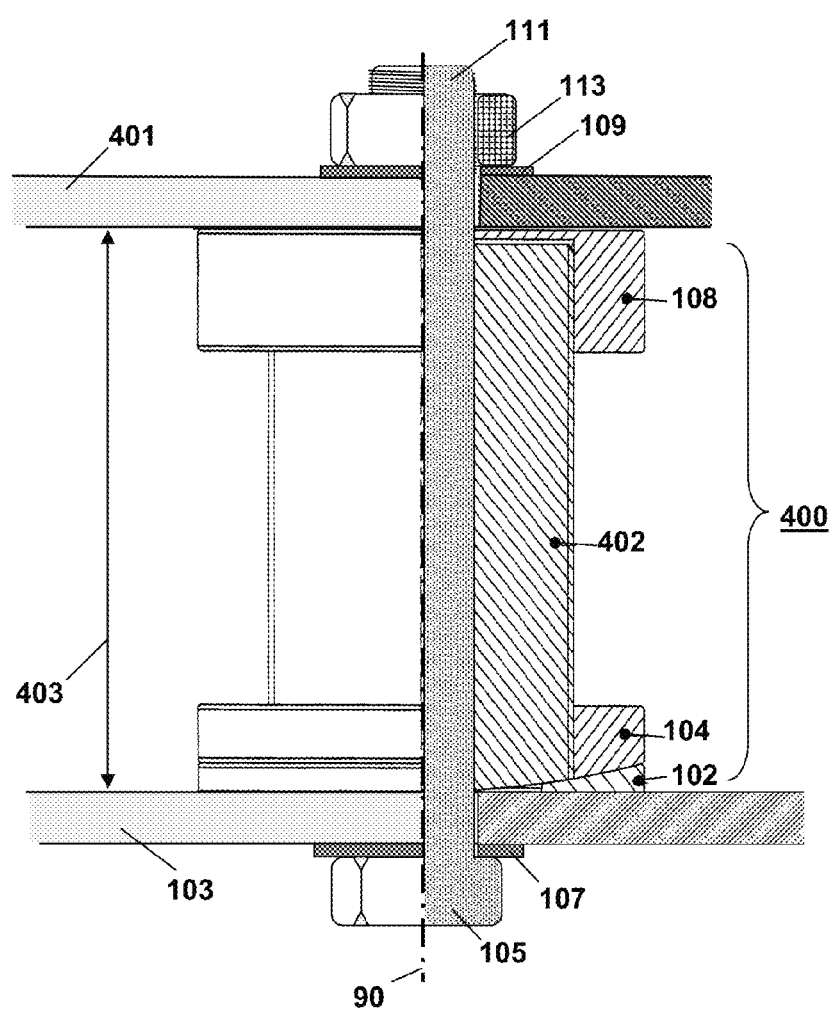
FIG. 4 is a diagram of a second adjustable chock according to the invention.

FIG. 4 is a diagram of a second adjustable chock 400 in the invention. The second adjustable chock 400 differs from the first adjustable chock 100 in that the center stud 106 of the first adjustable chock 100 has been replaced by another center stud 402 of longer length. The second adjustable chock 400 is used with the same first element 102, the same center element 104 and the same second element 108 as those of the first adjustable chock 100, owing to the modular design of the adjustable chock according to the invention. The other center stud 402 of longer length is chosen so as to enable the second adjustable chock 400 to bridge a second gap 403 between another piece of machinery 401 and the support 103. The second gap 403 is bigger than the first gap 50 bridged by the first adjustable chock 100.

Figure 5:
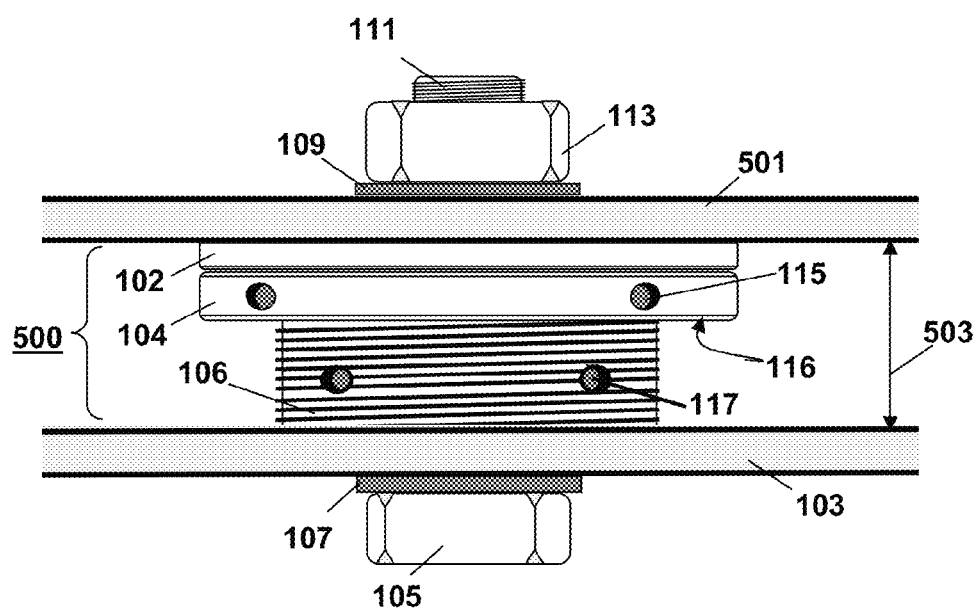
FIG. 5 is a diagram of a third adjustable chock of the invention.

FIG. 5 is a diagram of a third adjustable chock of the invention 500. A difference between the third adjustable chock 500 and the first adjustable chock 100 is that the second element 108 has been omitted. The third adjustable chock 500 is used with the same first element 102 and with the same center element 104 as those of the first adjustable chock 100, owing to the modular design of the adjustable chock according to the invention. The third chock 500 may use the center stud 106 of the first adjustable chock 100 or another one of different length so as to enable the third adjustable chock 500 to bridge a third gap 503 between still another piece of machinery 501 and the support 103. A configuration of the third adjustable chock 500 is used if there is no need for providing both a first way of adjusting the axial length of the adjustable chock by means of adjusting the relative positions of the center stud 106 and the center element 104 and a second way of adjusting the axial length of the adjustable chock by means of adjusting the relative positions of the center stud 106 and the second element 108. Preferably, the third adjustable chock 500 is oriented so as to have the flat upper surface 116 of the center element 104 face vertically downwards, i.e., in the direction of gravity, in operational use. This way, the region, where the first element 102 and the center element 104 engage, is better protected against the accumulation of dirt or moisture than if the third adjustable chock 500 were mounted with the upper surface 116 of the center element 104 facing up.

The invention claimed is:

1. An apparatus configured for use as an adjustable chock for connecting a piece of machinery to a support along a common axis of the adjustable chock, the apparatus comprising:
   a first element,
   a second element,
   a center element disposed on the first element and
   a center stud moveably engaged with the center element; wherein
      the first element has a first surface which contacts the center element and that is rotationally symmetrical and that is one of convex and concave; wherein
      the first surface has a first axis of rotational symmetry substantially aligned with the common axis of the adjustable chock in operational use of the adjustable chock; wherein
      the center element has an intermediate surface which contacts the first element and that is rotationally symmetrical and that is the other one of convex and concave with respect to the first surface; wherein
      the intermediate surface has a center axis of rotational symmetry substantially aligned with the common axis of the adjustable chock in operational use of the adjustable chock; wherein
      the first surface and the intermediate surface are complementarily shaped for engaging in operational use of the adjustable chock, only the intermediate surface of the center element contacts the first element, the intermediate surface overlying the first surface such that there is only abutting contact between the first element and the center element and the first element cannot prevent the center element from moving away therefrom; wherein
      the center element has a center through-hole that is cylindrical and that is coaxial with the intermediate surface; wherein
      a wall of the center through-hole is provided with an inner screw thread; wherein
      the center stud comprises a cylindrical outer surface; wherein
      the cylindrical outer surface has a stud axis of rotational symmetry that is substantially aligned with the common axis of the adjustable chock in operational use of the adjustable chock; wherein
      the cylindrical outer surface is provided with an outer screw thread for engaging with the inner screw thread of the center element so as to have the center stud and the center element connected through a screwed connection in operational use of the adjustable chock, the cylindrical outer surface has a constant diameter that corresponds to a maximum diameter of the center stud such that the center stud does not have any piece integral with it that has a larger diameter than the cylindrical outer surface; wherein the center stud comprises a stud through-hole that is cylindrical, that extends across a full length of the center stud and that is coaxial with the cylindrical outer surface, and wherein the second element includes a cylindrical recess with a second inner screw thread for engaging with the outer screw thread of the center stud so as to have the center stud and the second element connected through a further screwed connection in operational use of the adjustable chock.

2. The apparatus configured for use as an adjustable chock according to claim 1, wherein, the first element has a first through-hole coaxial with the first surface; and a diameter of the first through-hole is substantially larger than another diameter of the stud through-hole, the stud through-hole having a constant diameter throughout.

3. An apparatus configured for use as an adjustable chock for connecting a piece of machinery to a support along a common axis of the adjustable chock, the apparatus comprising:

a first element having a first through-hole,
a center element disposed on the first element and
a center stud moveably engaged with the center element; wherein the first element has a first surface which contacts the center element and that is rotationally symmetrical and that is one of convex and concave; wherein the first surface has a first axis of rotational symmetry substantially aligned with the common axis of the adjustable chock in operational use of the adjustable chock, the first through-hole being coaxial with the first surface; wherein the center element has an intermediate surface which contacts the first element and that is rotationally symmetrical and that is the other one of convex and concave with respect to the first surface; wherein the intermediate surface has a center axis of rotational symmetry substantially aligned with the common axis of the adjustable chock in operational use of the adjustable chock; wherein the first surface and the intermediate surface are complementarily shaped for engaging in operational use of the adjustable chock, only the intermediate surface of the center element contacts the first element, the intermediate surface overlying the first surface such that there is only abutting contact between the first element and the center element and the first element cannot prevent the center element from moving away therefrom; wherein the center element has a center through-hole that is cylindrical and that is coaxial with the intermediate surface; wherein a wall of the center through-hole is provided with an inner screw thread; wherein the center stud comprises a cylindrical outer surface having a diameter that corresponds to a maximum diameter of the center stud; wherein the cylindrical outer surface has a stud axis of rotational symmetry that is substantially aligned with the common axis of the adjustable chock in operational use of the adjustable chock; wherein the cylindrical outer surface is provided with an outer screw thread for engaging with the inner screw thread of the center element so as to have the center stud and the center element connected through a screwed connection in operational use of the adjustable chock; and wherein the center stud comprises a stud through-hole that is cylindrical, that extends across a full length of the center stud and that is coaxial with the cylindrical outer surface, a diameter of the first through-hole is substantially larger than another diameter of the stud through-hole, the stud through-hole having a constant diameter throughout, wherein the center stud has a surface that is complementarily shaped with respect to the first surface of the first element.

4. The apparatus configured for use as an adjustable chock according to claim 3, wherein:

the apparatus comprises a second element; and wherein
the second element includes a cylindrical recess with a second inner screw thread for engaging with the outer screw thread of the center stud so as to have the center stud and the second element connected through a further screwed connection in operational use of the adjustable chock.

5. A apparatus comprising:

a piece of machinery and
a support, wherein the piece of machinery and the support are attached to each other via at least one adjustable chock, the apparatus further including;
a first element,
a second element,
a center element disposed on the first element and
a center stud moveably engaged with the center element; wherein the first element has a first surface which contacts the center element and that is rotationally symmetrical and that is one of convex and concave; wherein the first surface has a first axis of rotational symmetry substantially aligned with the common axis of the adjustable chock in operational use of the adjustable chock; wherein the center element has an intermediate surface which contacts the first element and that is rotationally symmetrical and that is the other one of convex and concave with respect to the first surface; wherein the intermediate surface has a center axis of rotational symmetry substantially aligned with the common axis of the adjustable chock in operational use of the adjustable chock; wherein the first surface and the intermediate surface are complementarily shaped for engaging in operational use of the adjustable chock, only the intermediate surface of the center element contacts the first element, the intermediate surface overlying the first surface such that there is only abutting contact between the first element and the center element and the first element cannot prevent the center element from moving away therefrom; wherein the center element has a center through-hole that is cylindrical and that is coaxial with the intermediate surface; wherein a wall of the center through-hole is provided with an inner screw thread; wherein the center stud comprises a cylindrical outer surface; wherein the cylindrical outer surface has a stud axis of rotational symmetry that is substantially aligned with the common axis of the adjustable chock in operational use of the adjustable chock; wherein the cylindrical outer surface is provided with an outer screw thread for engaging with the inner screw thread of the center element so as to have the center stud and the center element connected through a screwed connection in operational use of the adjustable chock, the cylindrical outer surface has a constant diameter that corresponds to a maximum diameter of the center stud; wherein the center stud comprises a stud through-hole that is cylindrical, that extends across a full length of the center stud and that is coaxial with the cylindrical outer surface, and wherein the second element includes a cylindrical recess with a second inner screw thread for engaging with the outer screw thread of the center stud so as to have the center stud and the second element connected through a further screwed connection in operational use of the adjustable chock.

\* \* \* \* \*